Nov. 23, 1965  E. BENKOE  3,218,757
POWERED WHEEL VEHICLE AND TRACK ASSEMBLY
Filed March 24, 1964  4 Sheets-Sheet 1

INVENTOR.
ERWIN BENKOE
BY
Benjamin Sweedler
ATTORNEY

Nov. 23, 1965   E. BENKOE   3,218,757
POWERED WHEEL VEHICLE AND TRACK ASSEMBLY
Filed March 24, 1964   4 Sheets-Sheet 2
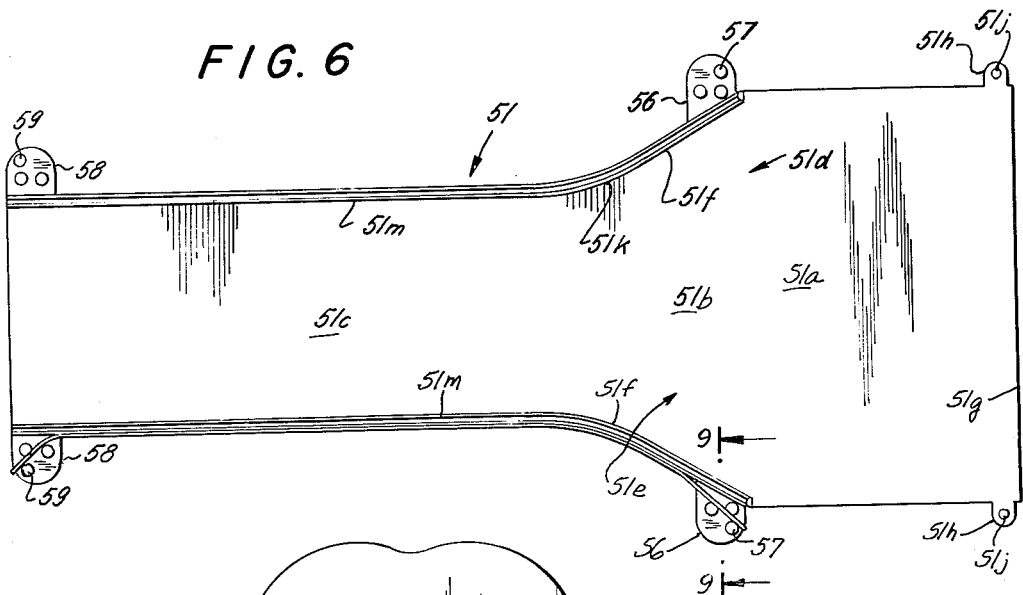
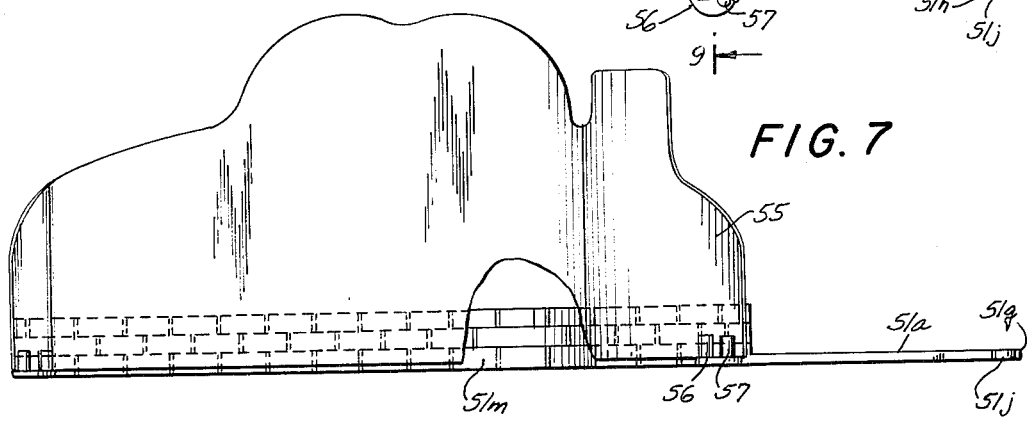
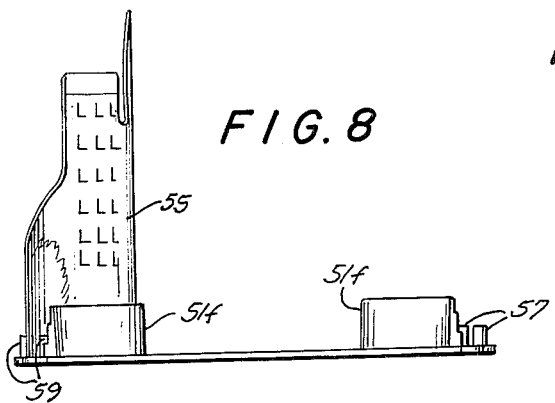
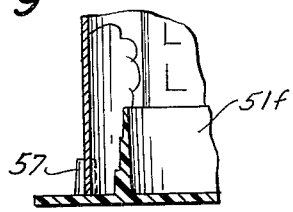
INVENTOR.
ERWIN BENKOE
BY Benjamin Sweedler
ATTORNEY Nov. 23, 1965 E. BENKOE 3,218,757
POWERED WHEEL VEHICLE AND TRACK ASSEMBLY
Filed March 24, 1964 4 Sheets-Sheet 3
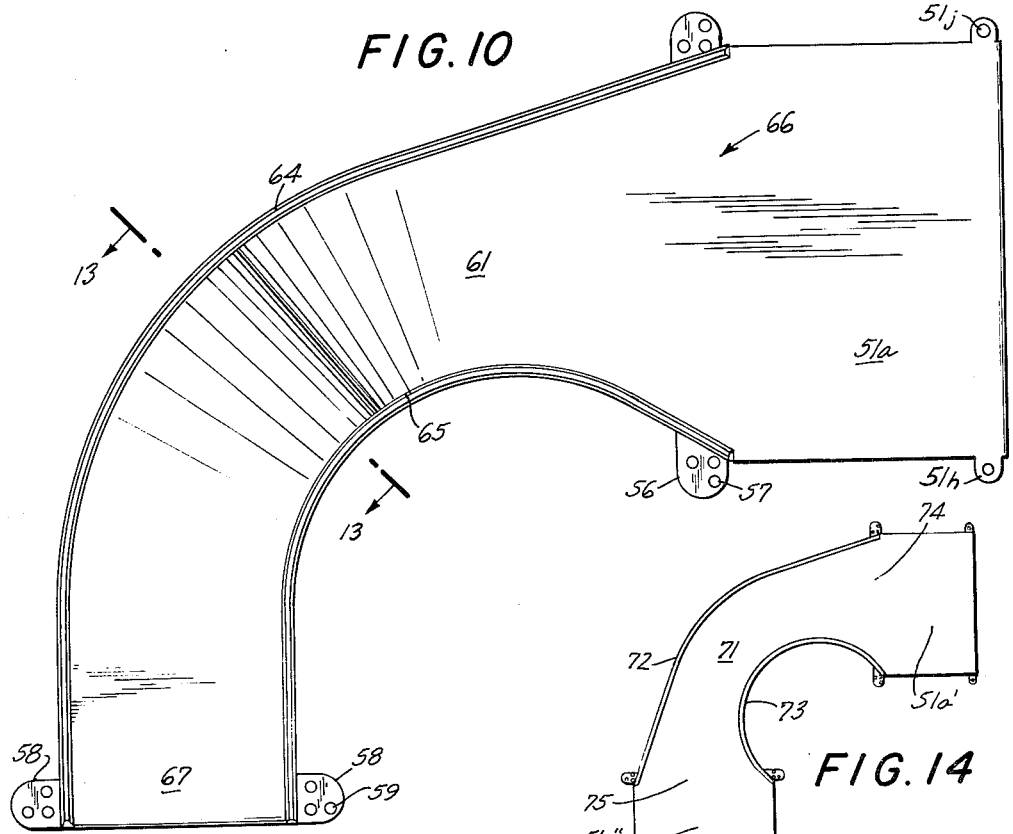
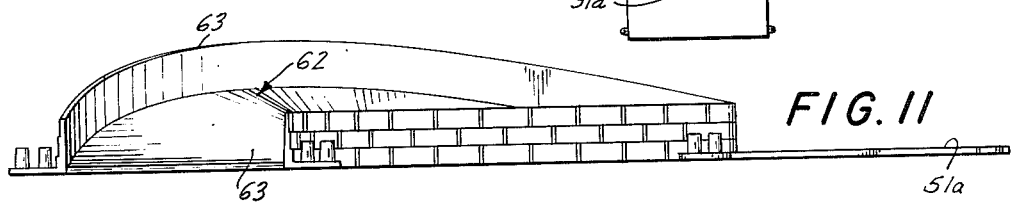
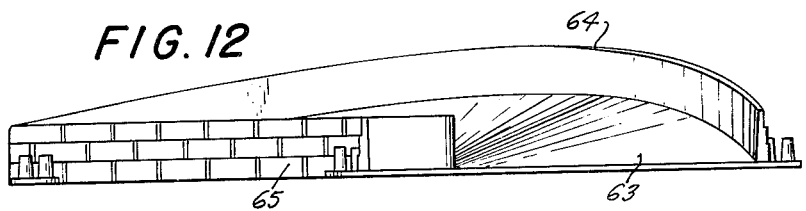
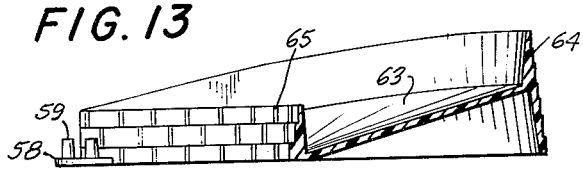
INVENTOR.
ERWIN BENKOE
BY
Benjamin Sweedler
ATTORNEY

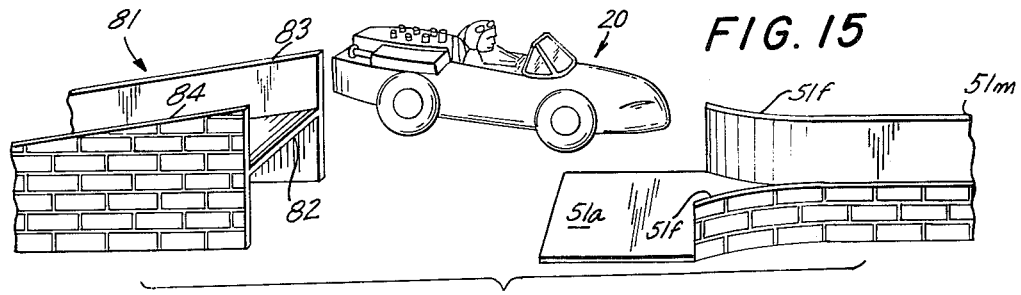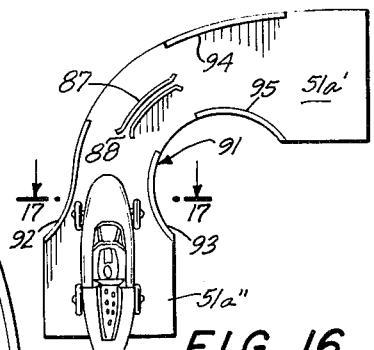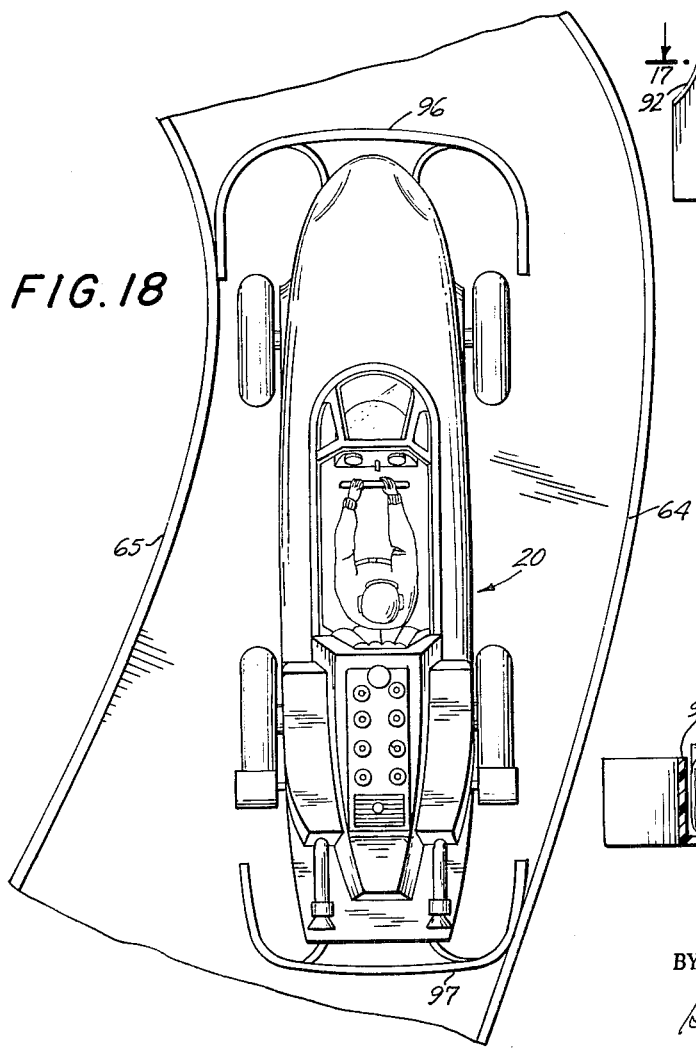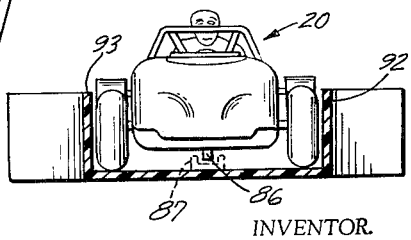

United States Patent Office 3,218,757
Patented Nov. 23, 1965

3,218,757
POWERED WHEEL VEHICLE AND
TRACK ASSEMBLY
Erwin Benkoe, New Hyde Park, N.Y., assignor to Transogram Company, Inc., New York, N.Y., a corporation of Pennsylvania
Filed Mar. 24, 1964, Ser. No. 354,312
10 Claims. (Cl. 46—202)

This invention relates to guided, wheeled, powered toy vehicles and to novel road or track members therefor.

Toys, such as automobile outfits involving an endless track for guiding the automobile travelling thereon are well known. Such toys provide the allure and fascination of a moving vehicle for the child. They are, however, subject to certain objections among which may be mentioned:

(1) For a reasonably long length of trackage, the number of track sections, each of a relatively short length, necessary for convenient handling, must be substantial and hence relatively costly;

(2) The relatively large number of track sections presents a storage problem, particularly where storage space is limited;

(3) For inexpensive constructions where the track sections must be relatively light in weight, it becomes necessary to mount the track sections on a suitable support;

(4) The usual endless tracks require the assembly of definite sections in a predetermined manner to form the continuous track, leaving the user little or no discretion or choice in the assembly of the sections or in the shape of the tracks, and hence the route or course to be travelled by the vehicle on the track; and (5) In use of the wheeled vehicle, an area is required to accommodate the continuous track; hence where space is limited as, for example, in relatively small room homes, the continuous or endless track and hence the travel of the vehicle thereon must be confined usually to the space of one room where endless or continuous track can be accommodated.

It is a principal object of the present invention to provide a guided, wheeled, powered toy vehicle and track or road members therefor which are free of the above-noted objections. The expressions "track" or "track member" or "track section" are used herein in a broad sense to include road members, i.e., surfaces on which the vehicle can travel; these expressions are not confined to a surface having upstanding walls or other guides on the opposite sides thereof.

It is another object of this invention to provide such guided, powered, wheeled toy vehicles and track members therefor which can be mass produced at relatively small expense.

It is still another object of this invention to provide a combination guided, powered, wheeled toy vehicle and track members requiring a relatively small number of different track sections which can be arranged in disconnected or spaced manner, as the user may elect, to provide different paths of travel for the powered vehicle, which paths can involve different areas such as two or more adjoining rooms.

Still another object of this invention is to provide such combination of guided, powered, wheeled toy vehicles and track sections in which the arrangement of the track sections in spaced or disconnected relation can involve factors of judgment or skill and this aspect of the combination can be used to provide a game of skill or a matter of competitive judgment in the utilization of the combination by two or more users or players.

Other objects and advantages of this invention will be apparent from the following detailed description thereof.

In accordance with this invention, a powered, wheeled vehicle is provided in which the wheels are mounted for rotation, but not for steering the vehicle when travelling between adjacent track sections. Thus the vehicle travels in straight direction, in the absence of extraneous influence when travelling between adjacent track sections. Cooperating with this vehicle are a plurality of track sections arranged to be placed in spaced relation, at least some of which cooperate with the vehicle to control its direction of movement. In one embodiment, for example, the vehicle has wheels provided with conical sides which cooperate with side walls on the track section so that the side walls of the track section in effect determine the direction of movement of the vehicle. The same result can be accomplished by bumpers on the vehicle. In another embodiment, the track section is provided with a guide groove receiving an appendage from the vehicle to control the direction of movement of the latter. By using a number of different track sections, for example, one or more, to give a right angle or other angle turn, with or without other sections to insure straight line movement between sections giving a change in direction, a path of travel can be provided of any desired extent and complexity and which path can include separated areas such as two or more adjoining rooms interconnected by an open doorway as will be pointed out more fully hereinafter.

The combination of the powered toy vehicle and track sections arranged in disconnected relation lends itself admirably to a game of skill from the standpoint of accuracy and imaginative disposition of the various track sections to obtain travel of the vehicle with no, or a minimum of obstruction by the guiding portions of the track sections and also from the standpoint of the length and intricacy of the path of travel provided by the selected arrangement of the track sections.

In a preferred embodiment, some or all of the track sections are provided with removable and replaceable scenic effects.

The vehicle can be any desired wheeled vehicle, such as a toy automobile, desirably a toy racer or sports car. It can be powered by a battery actuated electric motor, spring motor or any other available motor or engine. Two or more such vehicles can be used, if desired, with one and the same spaced disposition of track sections.

Referring to the drawings, in which is shown for illustrative purposes a battery actuated toy motor car of the racer type and several different forms of track sections, without, however, limiting the invention to these illustrative embodiments, FIGURE 1 is a diagrammatic composite perspective view of a powered toy vehicle and five track sections chosen for illustrative purposes and arranged to show one of many possible arrangements of spaced track sections, with these sections shown relatively close to each other to enable showing all in one figure. In actual use, the sections can be arranged farther apart, say 2½ to 3 feet or even more, separating adjacent sections;

FIGURE 6 is a plan view of a straight-away track section, equipped with removable scenery;

FIGURE 7 is a side elevation of the track section of FIGURE 6;

FIGURE 8 is a front view of the track section of FIGURE 7;

FIGURE 9 is a fragmentary vertical section taken in a plane passing through line 9—9 on FIGURE 6;

FIGURE 10 is a plan view of a banked track section, providing a right angle turn;

FIGURE 11 is a front view of the track section of FIGURE 10 showing approximately the left hand (viewing FIGURE 10) half of the track section;

FIGURE 12 is a front view of the track section of FIGURE 10 showing the right hand (viewing FIGURE 10) half in elevation;

FIGURE 13 is a composite view of the track section of FIGURE 10 showing a vertical section through approximately the transverse median of the curved portion and also showing in elevation the left hand (viewing FIGURE 10) sides of this track section;

FIGURE 14 is a plan view of another form of track section which can be used interchangeably for right and left turns;

FIGURE 15 is a fragmentary perspective view showing the exit end of a catapult track section and the inlet end of another track section with the vehicle shown in the relative position it occupies just after exiting from the catapult track section;

FIGURE 16 is a plan view of still another modified form of track section, of the type employed with a car having a depending projection movable in a guide slot in the floor or base of the track section, which guide slot is shown in FIGURE 16;

FIGURE 17 is a vertical section taken in a plane passing through line 17—17 on FIGURE 16 and shows the guiding mechanism for the vehicle shown in FIGURE 17; and FIGURE 18 is an enlarged plan view showing a bumper type guided vehicle and a fragment of a guiding track section therefor.

Figure 1:
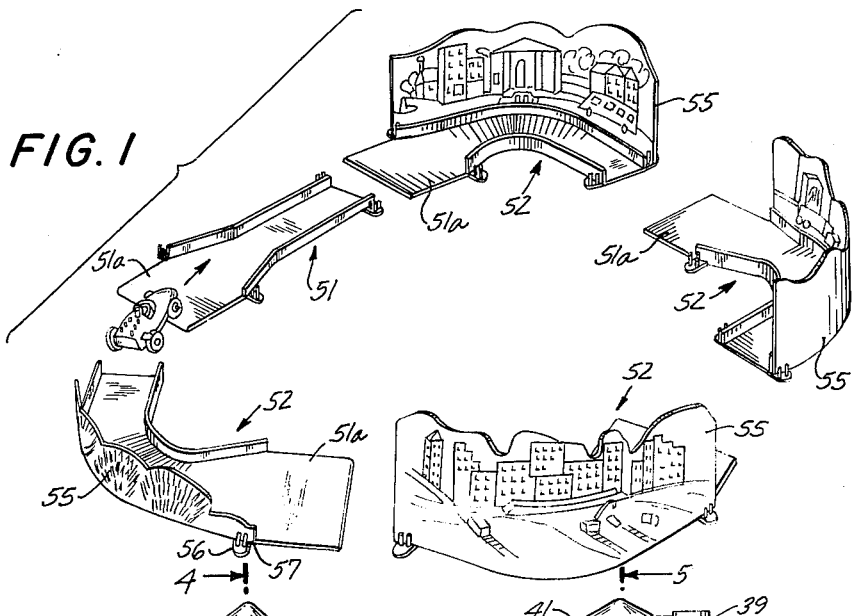

Referring to FIGURES 2 to 5, inclusive, which show a preferred form of powered vehicle 20, comprising a body 21 having mounted thereon a front axle 22 and a rear axle 23, in the embodiment of the invention shown these axles are fixed to the body and serve as supports for the rear wheels 24 and front wheels 25, respectively, rotatably mounted thereon. The axles can be mounted for rotation in bearings, if desired. In the embodiment shown in FIGURES 2 to 5, inclusive, they are mounted so that they cannot swivel; hence the vehicle continues to travel in a straight line direction in the areas between adjacent track sections in the absence of extraneous influence, e.g., a guiding surface contacted by the moving vehicle and thus causing it to change its direction of travel.

Vehicle 20 is shown provided with a driver 26 manipulating a steering wheel 27, which, however, has no steering function; these members are provided to add to the attractiveness of the toy. Suitably positioned in the body 21 is a battery 28 held in place within its housing by a spring contact 29 which makes electrical contact with a pole 30 of the battery. The other pole 31 of the battery which can be its electrically conducting housing, is positioned to be engaged by a spring arm 32 of a switch comprising a vertical movable switch member 33. When member 33 is manually depressed from the full line position shown in FIGURE 3, the spring arm 32 is moved into contact with pole 31, closing a circuit comprising the electrical conductors 34, 35 in circuit with the motor 36 which can be of any known type. The switch comprising the spring arm 32 and switch member 33 is maintained closed under the tension provided by spring arm 32 and cooperating wall 37 of the battery housing on member 33. To open this switch and thus interrupt the flow of current to motor 36, it is necessary to actuate the switch member 33 to return it to its elevated position shown in FIGURE 3.

Armature shaft 38 of motor 36 has fixedly mounted on the ends thereof for rotation therewith driving rolls 39 in frictional engagement with the rear tires 41 on rear wheels 24, thus providing a powered drive for the vehicle 20. It will be appreciated that this illustrative embodiment represents one of the many drives which can be used. Instead of the battery actuated motor, which is preferred, a spring or other motor can be used.

Figure 2:
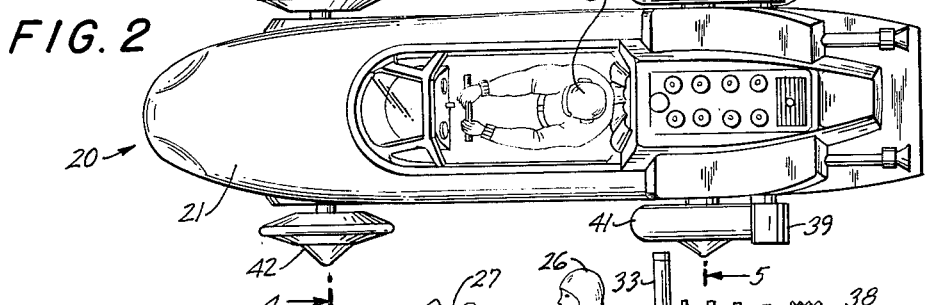
FIGURE 2 is a top plan view of one form of powered vehicle which can be used as the vehicle element of the combination with the disconnected track sections.
Figure 3:
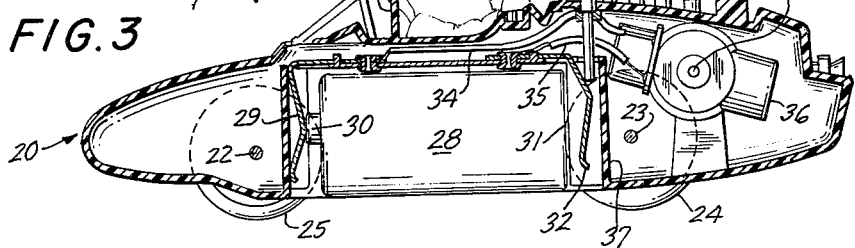
FIGURE 3 is a vertical longitudinal section, partly in elevation, through the vehicle of FIGURE 2.
Figure 4:
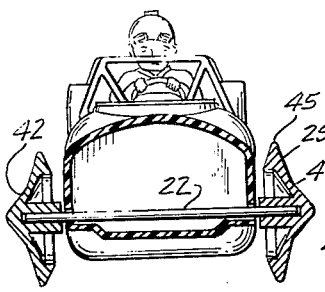
FIGURE 4 is a vertical section taken in a plane passing through line 4—4 on FIGURE 2.
Figure 5:
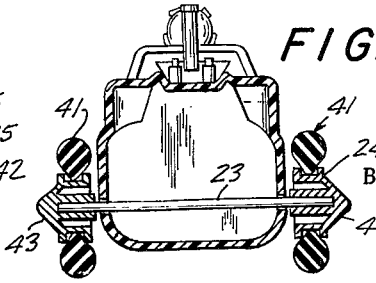
FIGURE 5 is a vertical section taken in a plane passing through line 5—5 on FIGURE 2.

In the embodiment of the invention shown in FIGURES 2 to 4, the front wheels 25 are provided with conical faces 42, i.e., the surface of each front wheel exposed to view when looking at it on the vehicle is of conical configuration as best shown in FIGURES 2 and 4. The rear wheels 24 are provided with conical hubs 43 on which the tires 41 are mounted. These conical surfaces cause the vehicle to change its direction of travel when the apex of a conical portion engages an upstanding member such as a guiding surface on a track section, hereinafter described. In other words, when the wheels of the moving vehicle abut a stationary guiding surface, the conical configuration of the wheels causes the vehicle to move laterally away from the guiding surface, thus changing its direction of travel.

The periphery 45 (FIGURES 2 and 4) of the front wheels of the vehicle, it will be noted from FIGURE 4, are narrow, i.e., make substantially line contact, where they travel on the track sections, hereinafter described. They are made of a material, e.g., polystyrene or other hard plastic or other construction material which has little or no resistance to sliding on the track section. There is thus a minimum of friction between the front wheels and the track section which must be overcome to effect the lateral movement of the front of the vehicle responsible for effecting a change in its direction of travel. The front wheels should not be made of rubber or other material which creates relatively large friction forces, or have a cross-section similar to that of the well known balloon tires which would create substantial resistance to lateral movement of the vehicle when the conical surfaces of the wheels abut or engage a guiding surface, as hereinafter more fully explained.

Referring now to FIGURE 1, this figure shows for illustrative purposes one assembly consisting of five different track sections. The number of track sections with one or more vehicles forming a unit package can vary. A comparatively inexpensive toy package can contain one guided, powered vehicle and from five to six or seven track sections comprising, for example, one or more straight-away track sections 51, which tend to align a vehicle exiting therefrom to travel in a straight line direction and four or more angle track sections 52 to impart to a vehicle travelling therethrough a change in a direction. While FIGURE 1 shows angle sections, the inlet and exit portions of which are substantially at a right angle to each other, the track sections used can have the inlet and exit portions at any desired angle. For more involved unit packages, the number of track sections as well as the different type sections included in such unit, can be varied as desired. The possibilities for variations in the intended path of travel of the vehicle challenge the imagination and this with a comparatively small number of track sections because the track sections are positioned, for example, from 2½ to 3 feet or more apart. The space between the track sections which can be the floor, rug, carpeting or other surface on which the vehicle travels, becomes part of the path of travel. This feature enables a track to be designed passing from one room into one or more adjoining rooms and this without involving any changes whatever in the existing division walls of the home or apartment. The doorway or entrance passage can be used to form the porton of the path of travel providing the bridging space between adjacent track sections.

This invention lends itself to addition of track sections, separately purchased from time to time to add to the interest and appeal of an initial unit package. Also, such package can be provided with two or even more of the vehicles; or one or more additional vehicles can be purchased to provide a toy in which the element of skill is involved due not only to proper and appealing arrangement of the track sections but also due to timing factors such as when and where the vehicles are released for travel or to provide a racing game involving cross-over paths of travel and the skills of the players in avoiding collisions as well as straight races where there is little or no hazard of collision because of the layout of the spaced track sections.

FIGURES 6 to 9, inclusive, show a straight-away track section 51 comprising a flat inlet portion 51a, a guiding portion 51b and an exit portion 51c. These track sections and the others also can be molded from plastic, e.g., polystyrene, or shaped from metal or other suitable material of construction which tends to develop little frictional resistance with the wheels of the vehicle passing thereover. The inlet portion 51a is desirably a flat rectangular plate of a length, in the direction of movement of the vehicle, at least equal to the distance between the axis of rotation of the front and rear wheels of the vehicle, e.g., between axles 22 and 23, and of a width at least equal to the width of the flared end 51d of the throat 51e formed by the upstanding converging sides 51f. By thus dimensioning the inlet portion 51a, four wheels of the vehicle rest on the flat inlet portion 51a before there is any possibility of the vehicle abutting any upstanding portion of the track section; the sides of flat plate portion 51a are free of obstructions. The flat plate 51a is made several times the width of the vehicle so that as a general rule there should be no difficulty in having the vehicle travel thereover into the throat 51e of the guiding portion 51b. Preferably all track sections have such inlet flat portion 51a.

Desirably, but not necessarily, the leading or front edge 51g of flat plate 51a has at its extremities ears 51h provided with openings 51j. These ears can be used to firmly fasten the front or receiving end of a track section to an underlying surface. Thumb tacks, for example, can be used for this purpose. Such ears can be provided at the rear and along one or more spaced points along the length of the track section. The throat 51e is desirably dimensioned so that its inlet or flared end 51d converges from the sides of flat plate portion 51a to the narrow end of this guiding throat. The sides of the latter are defined by the upstanding side walls 51f of a suitable height desirably at least equal to the radius of the wheels of the vehicle. Walls 51f are continued longitudinally in a stream-lined curve at 51k into the side walls 51m defining the sides of exit portion 51c. The height of side walls 51m desirably is the same as that of walls 51f. These side walls are the guiding elements of track section 51. When a vehicle enters inlet portion 51a not properly centered relative to the longitudinal median of this track section, the conical wheels or bumper engages the flared sides 51f which tends to cause the front of the moving vehicle to move laterally away from the sides. The net effect is that the vehicle exiting from the exit end 51c usually does so with its longitudinal axis approximately coincident with the longitudinal median of exit portion 51c. In the case of the straight-away or movement aligning track section, the longitudinal median of all three portions 51a, 51b and 51c are in alignment.

In the illustrative embodiment of FIGURES 6 to 9, track section 51 is designed to receive removable scenery 55 along one or both sides; the scenery members extend along the edges of the intermediate and exit sections, not along the edge of the flat inlet plate 51a, as shown in FIGURE 7. Such scenery can be in the form of a flexible cardboard or other flexible stock having sufficient rigidity to retain its shape even though flexed. Disposed adjacent the inlet end of throat 51e are ears 56 desirably formed integrally with the flat base. Each ear 56 has three integral upstanding pins 57 arranged triangularly, as shown in FIGURE 6. Ears 58 are similarly formed at the exit end of exit portion 51c. Ears 58 have upstanding pins 59 arranged thereon triangularly. The pins 57 and pins 59 are arranged so that the pins on each ear receive therebetween a lower corner or other desired portion of the flexible scenic cardboard stock 55 having scenic portrayals on the side exposed to view, frictionally engaging opposite sides thereof as shown in FIGURE 6, to maintain the cardboard stock vertically. FIGURES 6 and 7 show the scenery on one side only of the track section. Scenery in the form of a tunnel, etc., can be used which passes over a track section and has the opposite side, at the corners, or an intermediate area, secured between pins 57 and 59 and thus removably held over the track section. While for illustrative purposes only the track section of FIGURES 6 to 9, inclusive, has been shown with removable scenery in place, it will be understood the other track sections can also be equipped with such replaceable scenic members.

FIGURES 10, 11, 12 and 13 show a 90 degree angle turn section having an intermediate portion 61 which is banked as shown at 62, i.e., the base or floor 63 thereof inclines downwardly from the outer guide wall 64 to the inner guide wall 65. The inlet portion is the same as the inlet portion 51a of the track section of FIGURE 6, including the length thereof being such as to accommodate all four wheels of the vehicle. Hence this inlet portion as well as the respective ears for removably mounting scenic effects and the ears 51h at the front end of portion 51a are identified by the same reference characters.

The intermediate portion 61 makes a 90 degree turn from the exit end 66 of the inlet portion 51a which end 66 is the entrance to the intermediate portion 61 having the opposite side guide walls 64 and 65. These side walls as shown in the drawings curve through a 90 degree arc to provide side guides for the intermediate portion and the exit end 67 thereof.

FIGURE 14 shows a track section which like FIGURE 10 makes a 90 degree turn, but depending upon how it is positioned can make either a right turn or a left turn. The track section of FIGURE 14 comprises a curved intermediate portion 71 having side guide walls 72 and 73. The intermediate portion can be banked if desired. A first flat plate portion 51a' is formed integral with the throat end 74 of intermediate portion 71. A second flat plate portion 51a'' is formed integral with the opposite throat end 75 of intermediate portion 71. Each of these flat plate portions 51a' and 51a'' are dimensioned as hereinabove disclosed in connection with inlet plate portion 51a, namely, so that all four wheels rest thereon before the front of the vehicle can engage an upstanding wall 72 and 73. In this way the danger of the moving vehicle causing undesired displacement of a track section is minimized.

FIGURE 14 shows the track section in position to guide the vehicle entering at 51a' to make a left turn. By employing this track section so that the vehicle enters portion 51a'' the vehicle is guided to turn to the right.

In FIGURE 15, 81 is a catapult track section, the exit end of which comprises an upwardly inclined floor or base 82 having guiding side walls 83 and 84 on the opposite sides thereof. The inlet end of this catapult section is the same as 51a of the section shown in FIGURE 6 and also shown on the right hand side of FIGURE 15.

FIGURES 16 and 17 show a modified form of the invention in which the vehicle 20 has a depending projection 86 fixed to the body. This vehicle is designed to be used with track sections the floor of which is provided with a guiding channel or groove 87 in which the lower end of projection 86 rides. One form of such channel 87 is shown in FIGURES 16 and 17. It is formed by upstanding rails having at least one end, i.e., the inlet end, flared as at 88. In the modification of FIGURE 16 designed to provide both a left and right turn, both ends of the channel are flared. Constructions designed for only one way travel need have only the inlet end of channel 87 flared.

The FIGURE 16 track section like that of FIGURE 14 contains an intermediate portion 91 having at the opposite ends thereof flat plate portions 51a′ and 51a″ dimensioned as hereinabove disclosed and having the opposite ends flared. Flared side guiding walls 92 and 93 extend along the inlet portion of the throat positioned where the intermediate portion 91 joins the flat plate portion 51a″. Similar flared side guiding walls 94 and 95 are positioned at the throat portion where the intermediate portion 91 joins the flat plate portion 51a′. These flared guiding walls insure that the projection 86 will enter the flared end of the channel 87. This channel effects the change in the direction of the travel of the vehicle. The portion of the track section opposite the length of the channel 87 need not have upstanding side walls.

The track section of FIGURE 16, like that of FIGURE 14, can be used for left and right turns, as desired, depending upon which of the flat plate portions 51a′ or 51a″ serve as the inlet plate portion.

FIGURE 18 shows a vehicle 20 having a front wrap-around bumper 96 which extends completely across the front of the vehicle and along a portion of the sides, thus enveloping the front and a portion of the opposite sides of the vehicle as shown in this figure. This bumper when viewed from the front of the vehicle is of generally convex shape. A similar wrap-around bumper 97 is fastened to the rear of the vehicle and extends completely across the rear and along the opposite sides, as shown in FIGURE 18. In the vehicle 20 of FIGURE 18 the wheels need not have conical sides, but can be conventionally flat sided wheels.

In the modification of FIGURE 18 the change in direction as illustrated in this figure is effected by engagement between the wrap-around bumper and the guiding side walls 64 and 65. As in the other modifications, the front wheels of the vehicle are made of a relatively hard material such as polystyrene and where they contact the track surface are relatively narrow to make substantially line contact, thus minimizing frictional resistance between the rotating wheels and the floor of the track section, facilitating lateral motion of the vehicle relative to the track section through which it passes, i.e., facilitating the guiding movement of the vehicle.

All track sections disclosed can be produced by molding from suitable plastics, although the invention is not limited to plastic as the material of construction. They can be made from any suitable material of construction; preferably at least the floor or base of the track section should be made from a material which does not create substantial frictional resistance to the lateral movement of the vehicle, i.e., to the guiding movement.

It will be noted that the present invention provides a guided, wheeled, powered toy vehicle and track or road members therefor which are free of the objections of the heretofore conventional or endless track made up of a plurality of sections designed to be assembled in a predetermined manner. The track sections can be mass produced at relatively small expense. Only a small number of these sections are required to give a comparatively long length of travel for the powered vehicle. Sections can be arranged in any desired manner in spaced relation utilizing if desired adjoining rooms or other different areas having partitions or separating walls but having communication at certain points, for example, through one or more doorways. The combination of the guided, powered, wheeled toy vehicle (or a plurality of such vehicles) and the track sections can be employed to play games of skill or games involving competitive judgment as will be apparent from the above disclosure.

Since certain changes can be made in the above-described combination of powered vehicle and track sections and different embodiments of this invention could be made without departing from the scope thereof, it is intended that all matter contained in the above description or shown in the accompanying drawing shall be interpreted as illustrative and not in a limiting sense.

What is claimed is:
1. A toy comprising, in combination:
  a vehicle having front and rear rotatable wheel assemblies;
  at least the front assembly having a portion extending generally laterally outwardly therefrom in substantial alignment with its transverse axis;
  a plurality of track sections arranged to be positioned to define a path of travel for the vehicle;
  each of said track sections comprising:
  means for guiding the vehicle passing thereover; and
  at least one inlet portion;
  said guide means being engageable with the rotating portion of said front wheel assembly for changing the direction of travel of said vehicle.

2. A toy as defined in claim 1, wherein:
  the portion extending laterally outwardly from the front wheel assembly is of generally conical configuration, and has an apex for engaging said guide means.

3. A toy comprising, in combination:
  a wheeled vehicle having at least one rear wheel driving assembly; and
  a plurality of track sections arranged to be positioned to define a path of travel for the vehicle;
  each of said track sections comprising:
  means for guiding the vehicle passing thereover; and
  at least one inlet and intermediate portion;
  the dimensions of said inlet portion at least in a direction towards said intermediate portion of the track section being chosen to preclude any extraneous surface forces from being applied to the rear wheel assembly of the vehicle as a front wheel assembly thereof approaches a position of engagement with the guide means to enable the guide means to change the direction of travel of the vehicle as it passes thereover.

4. A toy as defined in claim 3, wherein:
  the track sections are arranged to be disposed in spaced relationship with respect to one another; and wherein:
  the dimension of said inlet portion in the direction extending towards said intermediate portion being substantially equal to the distance between the rear and front wheel assemblies.

5. A toy as defined in claim 4, wherein:
  said track sections further comprise:
  an exit chute along at least a portion thereof;
  said exit chute being narrower than the inlet portion, enabling the vehicle to egress from the track section in the correct direction for entry into the next section, and the inlet portion of said next section facilitating entry thereinto.

6. A toy as defined in claim 5, wherein:
  at least one of said track sections is of generally linear configuration.

7. A toy as defined in claim 6, wherein:
  the intermediate portion and the exit chute of another track section is disposed in angular relationship with respect to said inlet portion.

8. A toy as defined in claim 7, wherein:
  still another of said track sections further comprises:
  a second inlet portion, enabling the guide means thereof to change the direction of travel of said vehicle to either one of a plurality of directions, depending upon the inlet portion from which the vehicle enters upon said track section.

9. A toy as defined in claim 8, wherein:
the inlet portion of each track section is of converging configuration; and wherein:
said guide means comprises:
upstanding side walls, at least a portion of which converge to correspond with the converging portion of said inlet, and another portion of which extends along the intermediate portion and the exit chute from the narrow end of the side walls defining the converging portion therein; and wherein there is further provided:
ears extending outwardly from the track sections in substantially the same plane therewith, each of said ears having thereupon upstanding pins arranged in spaced relation;
said pins enabling flexible scenery members to be disposed therebetween in frictional engagement therewith.

10. A toy as defined in claim 9, wherein:
said front and rear wheel assemblies are mounted only for rotating movement about their axes, so that they cannot swivel when travelling between track sections to change the direction of movement of the vehicle.

References Cited by the Examiner
UNITED STATES PATENTS

| | | | |
|---|---|---|---|
| 749,607 | 1/1904 | Dutrieu | 104—54 |
| 2,254,153 | 8/1941 | Larrabee | 46—216 |
| 2,543,460 | 2/1951 | Larrabee | 46—216 |

RICHARD C. PINKHAM, *Primary Examiner.*